Figure 1:
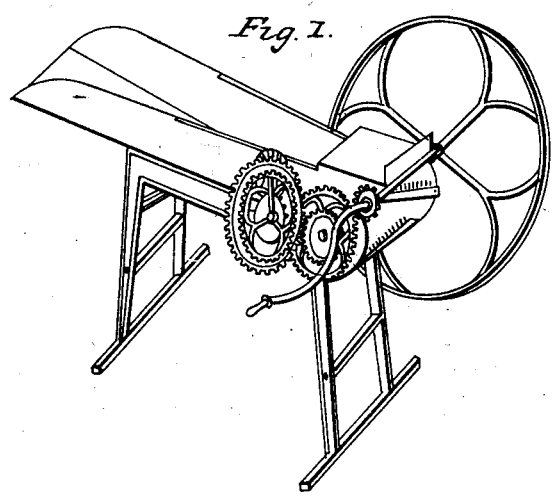

E. DEWEY.
Straw Cutter.

No. 766.  Patented June 4, 1838.

Witnesses:

Inventor:

UNITED STATES PATENT OFFICE.

EBENEZER DEWEY, OF BUTTERNUTS, NEW YORK.

MACHINE FOR CUTTING STRAW, HAY, TURNIPS, &c.

Specification of Letters Patent No. 766, dated June 4, 1838.

*To all whom it may concern:*

Be it known that I, EBENEZER DEWEY, of the town of Butternuts, in the county of Otsego and State of New York, have made, invented, constructed, and applied to use certain new and useful improvements in machines for cutting hay, straw, roots, &c., called "the cylindrical straw and root cutter."

The machine and improvement are described in the following schedule.

A cylinder is constructed by placing two cast-iron heads upon a shaft of iron. The heads are placed eight, ten or more inches apart according to the length of the knives to be used in the machine. The heads are drilled in the center and nicely fitted upon the shaft so that the circumferences of the heads shall be equidistant from the axis of the shaft and perpendicular to it. Upon the peripheries of the heads are flanges projecting an inch from their outer surface upon which are fastened the knives. A bolt passes through each end of the knives and is screwed into the flange and firmly fastens the knife to its place upon the head. The shaft lies horizontally as do the knives and the edges of the knives are equidistant from each other and from the axis of the shaft upon which the heads are placed. The edges of the knives while passing through a horizontal plane in which the axis of the shaft and the upper surface of the bed shear (upon which the hay, &c., rest while cutting lie) do not lie horizontally but one end of the knife is elevated above the other so that as the edge of the knife passes by the bed shear it cuts at only one point at the same moment as the cylinder revolves. And one end of the knife is elevated above the other as it passes by the bed shear one sixth of its length. The shaft above mentioned which I denominate "the cylinder" shaft is of a length suited to the size of the included machine. If the length of the knife is to be twelve inches, said shaft should be sixteen inches long and one and a quarter inch in diameter or larger.

The bearings upon which the heads are placed are turned one inch in diameter having a shoulder one eighth of an inch against which the head rests when placed upon the shaft. Contiguous to each head a bearing is turned upon which the shaft rests when placed in the machine. Upon one end of said shaft is placed a cog wheel eight inches in diameter which is driven by another cog wheel four inches in diameter placed upon another shaft (hereafter described called the crank shaft). Any number of knives are used that may be desired but four are deemed sufficient. The cog wheel first mentioned is placed two and a half inches from the head and between the end of the shaft and the bearing last mentioned. The cylinder (or cutter) is propelled by a crank attached to the end of another shaft upon which the cog wheel of four inches diameter is placed matching into and driving the cog wheel of eight inches diameter above mentioned. This last mentioned shaft (the crank shaft) rests upon bearings similar to those upon the cylinder shaft and is confined in boxes with caps attached by bolts to the frame of the machine. The crank shaft is four inches longer than the cylinder shaft for the purpose of attaching a crank to one end of it and a fly wheel to the other. The cog wheels above mentioned are placed upon the corresponding ends of the shafts and upon the end to which the crank is attached.

A cast iron or wooden frame is made and the sides of it are connected together by iron or wooden girths and are of such a distance apart as to admit the said cylinder between them and permit it to revolve freely. If the knives are twelve inches long the sides of the frame are thirteen inches apart.

The box in which the hay is placed for cutting is three feet long and at the forward end as wide as the length of the cutting edge of the knives and the other end as wide again or twice as wide and the sides of the box are five inches high made of inch and a quarter plank. At the front end of the box is placed the bed shear or bed knife upon which the hay, &c., rests when the machine is in operation. The bed knife is fastened to the frame of the machine by bolts which pass through the sides of the frame and are screwed into the ends of the bed knife. A slot is made horizontally in each side of the frame an inch and a half long and three-eighths of an inch wide perpendicularly through which said bolts last mentioned pass and are screwed into the ends of the bed knife. These slots being longer than the diameter of the slots permit said bolts to be moved backward and forward and thereby the bed knife is brought in contact with the edge of the knives. The manner of constructing and adjusting the bed knife is shown in the drawing accompanying this by reference to Figs. 2 and 3 which I deem a new and important improvement. The bed knife is two and a half inches wide and a quarter of an inch thick with a flange upon each end two inches wide, and in front next to the edge of the knives the flange is one inch wide and three eighths of an inch thick at the ends and in front also.

The flanges at the ends are for the purpose of holding the bed knife firmly in its place by means of the bolts which pass through said slots and the flange in front and under the bed knife is to give strength to it.

The bed knife rests upon ledges projecting one fourth of an inch from the inner surface of the frame of the machine.

Two rollers are placed in the box of the machine near to the bed shear by which the hay, &c., is drawn into the machine while cutting. Said rollers are three and a half inches in diameter. The rollers are driven in the following manner: A shaft passes through each roller and a cog wheel containing sixty cogs or more is placed upon the lower roller shaft (which projects three inches through the side of the frame upon the side of the machine where the crank is placed) which last mentioned wheel is driven by another wheel of twenty cogs placed upon the end of the cylinder shaft. Upon the corresponding ends of the roller shafts two cog wheels of five inches diameter with ten cogs each one and a half inch in length which two last wheels match into each other and the upper roller is operated by the wheel of ten cogs upon the lower roller shaft and the lower roller is propelled by the wheel of twenty cogs upon the cylinder shaft. The lower roller is stationary except that it revolves. The upper roller lies parallel and perpendicular to and over the lower roller and rises and falls three quarters of an inch to permit the hay, &c., to pass freely through the machine. The upper roller is fluted and lower one is smooth. Through the sides of the machine where the upper roller shaft passes a slot or oblong hole is made three fourths of an inch longer than it is wide, the width being the thickness of or equal to the thickness of the shaft to permit the upper roller to rise and fall ¾ of an inch as the thickness of the hay shall require.

The upper roller is kept pressed down upon the hay while cutting by springs attached one to each side of the box. Directly over the shaft of the upper roller a hole is bored through each side of the box three fourths of an inch in diameter into which a bolt is put that extends from the shaft to the upper edge of the box. One end of each spring rests upon the upper end of one of these bolts which are kept constantly pressed upon the upper roller shaft whereby the said upper roller is kept constantly pressed upon the hay while it is drawn into the machine by and between the rollers. The rollers are placed at such distance from the cylinder as is necessary to arrange the gearing above described so that all parts of the machine shall operate.

Upon the cylinder shaft and between the heads above described is placed a cylinder of wood two inches less in diameter than the diameter of the said heads. This wooden cylinder is fluted spirally corresponding with the edges of the knives so that whatever is cut in the machine may pass freely through between the wooden cylinder and the knives. The space between the edge of the knives and the wooden cylinder should be one inch and increase toward the back of the knife where it should be one and a half inch. Upon the fore part of the machine directly over the cutting cylinder is placed a hopper which is made a part of the machine or firmly attached to it, into which turnips and other roots are placed to be cut.

The wooden cylinder is placed upon the shaft of the cutting cylinder to regulate the thickness of the slices into which turnips, &c., are to be cut. In the said wooden cylinder half an inch from the edges of the horizontal knives rows of short knives standing perpendicularly to the cylinder and the horizontal knives, an inch (or more or less) apart according to the size it is intended to cut the slices. These short knives are half an inch wide, one sixteenth of an inch thick, and an inch long with a shank an inch long and are driven into the said wooden cylinder. They project from the wooden cylinder so that the point or outer end of the knives will just escape the bed knife when the machine is in operation. By these short knives the slices cut by the horizontal knives are again cut in an opposite direction into slices of an inch or more or less square. The box in which the hay, &c., is placed for cutting is attached to the frame of the machine by nails or screws driven into the girths which connect the sides of the frame together. The said frame consists of two sides connected together by cross pieces or girths of wood of such length as the cutting cylinder shall require. If the length of said cylinder is ten inches the girths are ten and a half inches long and in the same proportion for a larger or smaller machine. Each side consists of two legs connected together by a cross piece at the top. The hind legs stand perpendicularly and forward legs stand projecting forward so that their feet are six inches farther from the feet of the hind ones than their tops are. From the front end of each side of the frame extends a piece, cast or made solid to it, of the same thickness with the sides of the frame three inches wide at the lower end and two inches wide at the top. These pieces do not stand perpendicular to the frame but the top leans forward so that the front edges of them and a line dropped perpendicularly would form an angle of forty degrees. To the front edges of these last described pieces the boxes, in which the bearings of the cylinder shaft and crank shaft rest and revolve, are attached. Said boxes on the half of each is cast solid to or firmly attached to the said front edge and the other half is secured to its place by bolts which pass through them and are screwed into the half of the box upon the frame. The springs which confine and press down the upper roller should be made of steel or firm and elastic wood two feet long confined to the top of the side of the box with screws.

The lower feeding roller is so placed that the surface of it is raised one quarter of an inch above the upper surface of the bottom of the box in which the hay is placed for cutting and the upper roller is placed three fourths of an inch above the lower one and may be raised three fourths of an inch which would leave a space of an inch and a half between them for the hay to pass and a sheet of hay of that thickness may be cut in the machine.

To the end of the crank shaft opposite to the crank is attached a fly wheel weighing 60 or more pounds three feet in diameter to regulate the motion of the machine when in operation.

The horizontal knives above described should be made strong and substantial so that they shall not spring, bend or vary when cutting. They should be two inches wide and half an inch thick at the back gradually tapering to the edge. If these knives are longer than twelve inches they should be proportionally stouter and stronger. These knives not being placed upon the heads at right angles to them are twisted a little so that they will lie firmly in their places upon the heads and that their edges shall come in close and exact contact with the bed kuife.

In order to make the knives come in exact contact with the bed knife they should be fitted to the heads before they are tempered and the shaft or cylinder placed in a lathe and the face of the knives turned off truly and afterward tempered and the knives will be true and fit the bed knife exactly.

I claim—

The improvement in the above described machine which I claim as being new and for which I ask a patent consists in the manner of adjusting the bed knife as is also above described and as will appear by reference to the accompanying drawings of said machine and its parts.

Figure 2:
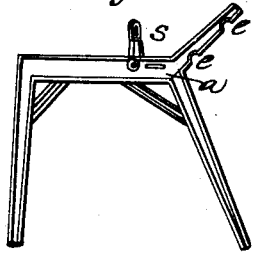
Figure 3:
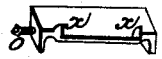

In said drawings Figure 1 represents the machine when all its parts are combined and ready for operation. Fig. 2 exhibits one side of the frame of the machine with the slot or oblong hole "$a$" through which the bolt passes and screws into the end of the bed knife which is moved backward or forward at pleasure by loosening the bolt. The bed knife is represented by Fig. 3, with the bolt which secures the bed knife firmly in its place screwed into the end of it, at "$o$." "$e, e$," in Fig. 2 show the half of each box in which the bearings of the crank and cylinder shafts rest. "$s$," represents the box or place in which the upper roller shaft revolves being made longer up and down than it is wide to permit the said shaft to rise and fall under the pressure of the springs. "$x\ x$" show the upper surface of the bed knife upon which the hay rests when cut and which occupies the space between the lower roller and the edges of the horizontal knives being about $2\frac{1}{2}$ inches and also show two perpendicular projections an inch long or high which arise from the front edge of the knife and an inch and a quarter from the ends of it between which the hay is confined when cut.

In testimony that the above is a true specification of my improvement as described I have hereunto set my hand and seal this 23d day of May, 1838.

EBENEZER DEWEY. [L. S.]

Witnesses:
  JOHN A. HODGE,
  WALTER G. HODGE.